(12) United States Patent
Tomasi et al.

(10) Patent No.: US 6,690,618 B2
(45) Date of Patent: Feb. 10, 2004

(54) METHOD AND APPARATUS FOR APPROXIMATING A SOURCE POSITION OF A SOUND-CAUSING EVENT FOR DETERMINING AN INPUT USED IN OPERATING AN ELECTRONIC DEVICE

(75) Inventors: Carlo Tomasi, Palo Alto, CA (US); Fahri Sürücü, Fremont, CA (US)

(73) Assignee: Canesta, Inc., San Jose, CA (US)

( * ) Notice: Subject to any disclaimer, the term of this patent is extended or adjusted under 35 U.S.C. 154(b) by 0 days.

(21) Appl. No.: 10/115,357

(22) Filed: Apr. 2, 2002

(65) Prior Publication Data

US 2002/0167862 A1 Nov. 14, 2002

Related U.S. Application Data

(60) Provisional application No. 60/281,314, filed on Apr. 3, 2001.

(51) Int. Cl.[7] .................................................. G01S 3/80
(52) U.S. Cl. ........................ 367/127; 367/124; 367/907
(58) Field of Search ................................. 367/124, 127, 367/129, 907

(56) References Cited

U.S. PATENT DOCUMENTS

| | | | |
|---|---|---|---|
| 3,647,962 A | * 3/1972 | Whetstone | ................... 367/127 |
| 3,857,022 A | 12/1974 | Rebane et al. | |
| 4,187,492 A | 2/1980 | Deligneres | |
| 4,312,053 A | 1/1982 | Lipsky | |
| 4,333,170 A | 6/1982 | Mathews et al. | |
| 4,376,301 A | 3/1983 | Roberts | |
| 4,506,354 A | * 3/1985 | Hansen | ....................... 367/907 |
| 4,599,607 A | * 7/1986 | Hill | ........................... 178/17 C |
| 4,677,600 A | * 6/1987 | Yoshida | ....................... 367/127 |
| 4,686,655 A | 8/1987 | Hyatt | |
| 4,716,542 A | 12/1987 | Peltz et al. | |
| 4,956,824 A | 9/1990 | Sindeband et al. | |
| 4,980,870 A | 12/1990 | Spivey et al. | |
| 5,056,791 A | 10/1991 | Poillon et al. | |
| 5,099,456 A | 3/1992 | Wells | |
| 5,166,905 A | 11/1992 | Currie | |
| 5,174,759 A | 12/1992 | Preston et al. | |
| 5,573,077 A | 11/1996 | Knowles | |
| 5,617,371 A | 4/1997 | Williams | ..................... 367/13 |
| 5,825,033 A | 10/1998 | Barrett et al. | |
| 6,002,435 A | 12/1999 | Yamamoto et al. | |

FOREIGN PATENT DOCUMENTS

| | | |
|---|---|---|
| EP | 0233464 A1 | 8/1987 |
| EP | 0 420 500 A2 | 4/1991 |
| EP | 0629964 A1 | 12/1994 |
| EP | 0982676 A1 | 3/2000 |
| EP | 1039365 A2 | 9/2000 |
| EP | 1 045 586 A2 | 10/2000 |
| WO | WO 84/00427 A1 | 2/1984 |
| WO | WO 00/19705 A1 | 4/2000 |

OTHER PUBLICATIONS

A. E. Savakis et al., "Restoration of Real Defocused Images Using Blur Models Based on Geometrical and Diffraction Optics," 1991, IEEE, pp. 919–922.
Ren C. Luo et al., "Defocusing Blur Restoration in Natural Scene Images for Factual Analysis," Nov. 15, 1993, IEEE, pp. 1377–1381.
"Speaker Position Detection System Using Audio–visual Information", Naoshi Matsuo, Hiroki Kitagawa, Shigemi Nagata, *Fujitsu Scientific and Technical Journal,* vol. 35, No. 2, Dec. 1999, pp 212–220.
"Virtual Keyboard", *IBM Technical Disclosure Bulletin,* vol. 32, No. 10B, Mar. 1990, pp 359–360.

* cited by examiner

*Primary Examiner*—Ian J. Lobo
(74) *Attorney, Agent, or Firm*—Shemwell Gregory & Gregory; Van Mahamedi

(57) ABSTRACT

A plurality of sound-detecting devices are configured to detect sound from an event of interest. Information about the sound is recorded that is dependent on a distance between the source position and the location of the sound-detection devices. The source position is approximated using the recorded information and the relative position of individual sound-detection devices to one another. The approximated source position is used as input for operating a electronic device.

53 Claims, 9 Drawing Sheets

METHOD AND APPARATUS FOR APPROXIMATING A SOURCE POSITION OF A SOUND-CAUSING EVENT FOR DETERMINING AN INPUT USED IN OPERATING AN ELECTRONIC DEVICE

RELATED APPLICATIONS

This application claims benefit of priority to Provisional U.S. Patent Application No. 60/281,314, filed Apr. 3, 2001, entitled "A Localization System Based On Sound Delays," and naming Carlo Tomasi as an inventor. The aforementioned priority application is hereby incorporated by reference in its entirety for all purposes.

FIELD OF THE INVENTION

The present invention relates to position detection methods and apparatuses. In particular, the present invention relates to a method and apparatus for approximating a source position of a sound-causing event for determining an input used in operating an electronic device.

BACKGROUND OF THE INVENTION

There are several known techniques for approximating the position of objects using acoustics, light and radio-frequency waves. These types of localization technologies have a wide array of applications, including, for example, use in navigation and medical applications.

In the field of acoustics, one type of sonar technology generates sound waves that can be reflected off of objects. An acoustic wave may be generated and sent out in a particular direction. If the acoustic wave encounters an object, the acoustic wave is reflected back to the source position. The time-of-travel for the acoustic wave to be sent out and reflected back is used to determine a distance of the object from the source position.

More advanced acoustic wave reflection and detection techniques exist. For example, ultrasounds can map a three-dimensional object by bouncing acoustic waves off the object.

Another type of acoustic application includes devices that use an array of microphones to record sounds. A typical use for a microphone array is to detect the direction of a voice in a room and to perform signal processing so as to enhance the voice recording from that direction.

Another type of acoustic localization technology is passive sonar. Passive sonar devices listen for sounds emitted by designated objects. For example, passive sonar technology is often used to detect underwater vessels and marine life. Typical passive sonar applications look for sound over large underwater domains. The sounds that are detected and processed by such applications are continuous signals, such as emitted by submarines. These sounds may last seconds or even minutes. In order to process continuous sounds, passive sonar applications transform detected signals into the frequency domain, and apply complex frequency-based processing methods to determine signal delays.

Triangulation is one common technique used to identify position information of objects. Triangulation typically uses radio-frequency (RF) waves. A device can be located by having an RF transmitter that emits signals detectable to a matching receiver. The receiver triangulates signals received from the transmitter over a duration of time in order to determine the transmitter's position.

SUMMARY OF THE INVENTION

The foregoing needs, and other needs and objects that will become apparent for the following description, are achieved in the present invention, which comprises, in some aspects, a method, apparatus, system and device that approximate a source position of a sound-causing event for determining an input used to operate an electronic device.

In an embodiment, sound caused by an event of interest is detected at a plurality of detection points. Information about the sound is recorded. This information is dependent on a distance between the source position and the location of the detection point where the sound is received. The source position is approximated using the recorded information and the relative position of individual detection points relative to one another. The approximated source position is used as input for operating the electronic device.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

DETAILED DESCRIPTION OF THE INVENTION

Figure 1:
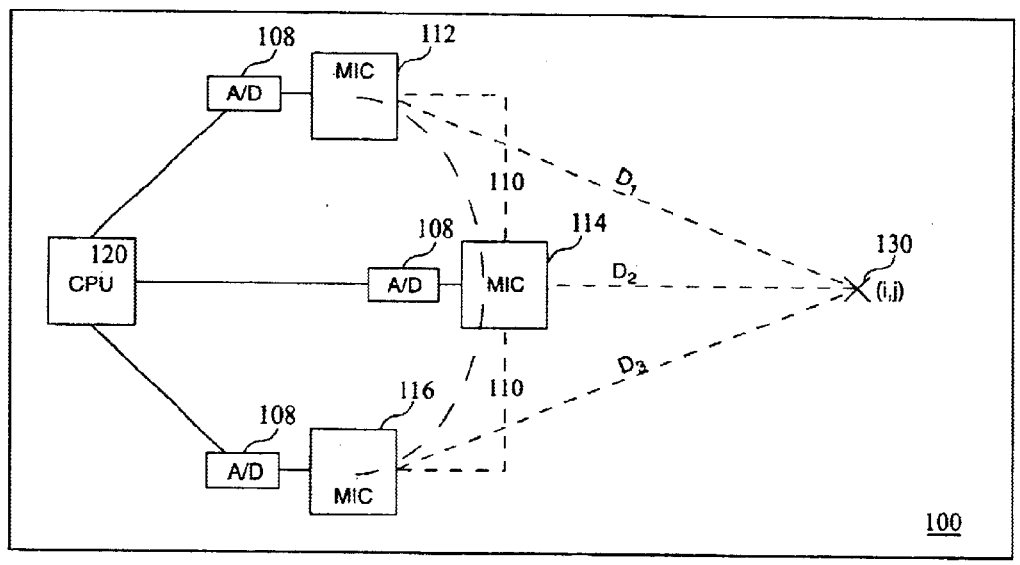
FIG. 1 is a block diagram of a localization apparatus, under an embodiment of the invention.

Embodiments of the invention describe a method and apparatus for approximating a source position of a sound-causing event. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

Embodiments of the invention provide a method and apparatus for approximating a source position of a sound-causing event for determining an input used to operate an electronic device. According to one embodiment, sound caused by an event of interest is detected at a plurality of detection points. Information about the sound is recorded. This information is dependent on a distance between the source position and the location of the detection point where the sound is received. The source position is approximated using the recorded information and the relative position of individual detection points relative to one another.

In another embodiment, a system is provided that includes sound-detection devices and a processor operatively coupled to the sound detection devices. The processor can determine when sounds received by the sound-detection devices correspond to the arrival of sound from an event of interest. The processor can approximate the source position of the sound, and use the source position as input for executing an operation.

As used herein, the term "approximate" may refer to a determination or measurement that is 80% accurate.

An "electronic device" includes devices having processing resources. Examples of electronic devices that can be used with embodiments of the invention include mobile phones, personal-digital assistants such as those operating a PALM OS (manufactured by PALM INC.) or POCKET PC (manufactured by MICROSOFT CORP.), digital cameras, and personal computer systems such as laptop or desktop computers.

A "sound-causing event" is an event that causes a short, sharp sound to occur. The event may be the result of an activity, action, or movement. For example, in an application discussed with FIG. 8, the event corresponds to a user initiating contact with a finger to a surface such as a table. In many cases, the sound-causing event is short and discrete. In some embodiments, the duration for the sound-causing event is less than a second, or even half a second, and preferably less than 250 milliseconds. The duration of a sound emitted by the sound-causing event originating from the position where the event occurred may have a similarly short duration. Accordingly, embodiments of the invention provide that sounds from the sound-causing events may be utilized as transient signals for processing purposes, in that the sounds have sharp peaks and relatively short durations.

"Sound-detection devices" include microphones. Specific examples of microphones for use with embodiments of the invention include electromagnetic, electrostatic, and piezoelectric devices. The sound-detection devices may process sounds in analog form. The sounds may be converted into digital format for the processor using an analog-digital converter. Among other advantages, embodiments of the invention allow for a diverse range of applications in which events of interest can be located through sounds that are emitted when those events occur. The sounds from the events of interest are used to determine the range of the source position from a designated point. In turn, the source position of the event of interest may be determined. The determination of the source position may be interpreted as input for operating an electronic device.

Some of the applications discussed by embodiments of the invention include use in detecting a key selected by a user on a keyboard, where the keyboard is presented as an image. Another application discussed is the ability to automate focusing and tracking of an image capturing device, such as a video recorder. For example, a video recorder may be configured to detect the approximate position of a speaker in a room. The speaker's position may be input for focusing and tracking the speaker with the video recorder or other image capturing device.

Accordingly, embodiments of the invention have particular applications in which the source position of a sound emitted from an event of interest corresponds to input for operating an electronic device. In particular, a system or apparatus incorporated under an embodiment may be portable. For example, portable microphones may attach to a mobile computer system, such as a personal-digital assistant or cell phone. A processor of the computer system may execute operations using a source position of sound arising from an event of interest as input.

In this way, a system or apparatus such as provided under an embodiment of the invention may be in the vicinity of the event that causes the sound. For example, the system or apparatus may be within a room or building in which the event takes place. The system or apparatus may be used on a table in which the event of interest occurs. Specific dimensions of regions that may contain both the event of interest and the system or apparatus include, for example, dimensions of 10 meters by 10 meters. In some applications, sounds can be differentiated from regions that are square inches or less in area, where the regions combined occupy an area of less than two feet in either direction.

Furthermore, embodiments of the invention determine approximate positions emitted from events of interest using relatively simple computational methods. Since the duration of sounds detected from events of interest are relatively short, all computations needed to approximate the source position from an event of interest may be performed in the time-domain, without transforming any of the signals into the frequency domain. The use of transient time signals by some embodiments may preclude the use of more complex frequency-domain processing, such as used in many passive sonar applications. As a result, embodiments of the invention enable relatively simple computational methods to be employed for approximating the source position of an event of interest. The use of relatively simple computational methods conserves processing and computing resources, enabling embodiments of the invention to be employed with relatively small electronic devices. As such, embodiments of the invention compare favorably to prior art applications, such as current passive sonar technology, which uses more extensive computational methods to determine position information based on measured sound delays.

B. System Description

FIG. 1 is a block diagram of a localization apparatus, under an embodiment of the invention. The localization apparatus 100 includes a set of microphones (collectively referred to as "microphone set" 110) employed as sound-detecting devices. Given an example such as shown by FIG. 1, microphone set 110 includes a first microphone 112, a second microphone 114 and a third microphone 116. The microphones in microphone set 110 are operatively coupled to a electronic device 120. The relative positions of individual microphones in the microphone set 110 are known relative to other microphones in the microphone set. In one embodiment, each microphone in the microphone set 110 is coupled to the electronic device via an analog-digital converter 108.

The electronic device 120 may be formed by a combination of processing and memory resources. For example, electronic device 120 may correspond to a desktop or laptop computer equipped with a sound card for receiving information form microphones in microphone set 110. In one embodiment, electronic device 120 may be a computer system, such as described with FIG. 9.

In one embodiment, the microphones in the microphone set 110 are fixed relative to one another. For example, each microphone 112, 114 and 116 may be positioned in one housing. In another embodiment, the microphones in the microphone set 110 may be independently positionable relative to the other microphones in the microphone set. For example, microphones in the microphone set 110 may each be operatively coupled to the electronic device 120 via a wire link. Alternatively, the microphones in the microphone set 110 may be operative coupled to the electronic device 120 electronic device using a wireless link, such as through infrared or RF communications. In such embodiments, the relative positions of the microphone in microphone set 110 have to be determined once the individual microphones are positioned.

If the localization apparatus is to be used on a surface, such as the top of a desk or other surface, it may be beneficial to couple the sensitive element of the microphones 110 intimately with the surface itself, so that sounds are recorded with the highest possible strength. Coupling can be achieved by pushing the microphones onto the surface. The weight of a package containing the microphones 110 may be sufficient to exert this push. In one embodiment, one or more of the microphones 110 may be slightly protruding from the bottom surface of its package, and pushed by a spring from the back. When the package is placed on the surface, its weight compresses the spring, and helps maintain contact between the microphone 130 and the surface.

In this situation it may also be desirable to shield the microphones 110 from spurious sounds propagating through air. This can be achieved with foam mufflers placed around the microphones themselves.

Embodiments of the invention employ microphones on at least three detection points. Thus, FIG. 1 illustrates three microphones in microphone set 110, each positioned at a detection point. The microphones in the microphone set 110 may be arranged in a curve or non-linear fashion with respect to a reference plane. The reference plane may coincide with the sheet of paper.

To improve performance, the microphones in the microphone set 110 may be arranged so as to enclose or at least partially surround a space where the event occurs. For instance, in a room, microphones could be placed at the corners. If the microphones are used to determine the location of taps on a surface, then the best performance is achieved when they are placed around the area where the taps occur. However, placement for optimal localization may not always be desirable. For instance, if the localization apparatus is to be used to enter text into a portable device, then it is desirable to arrange the microphones as close as possible to each other, in order to reduce the size of the package. In cases like this, compromises must be made between localization accuracy and other constraints on microphone placement.

For purpose of illustration, a sound-causing event may occur at a source position 130. The source position 130 has coordinates (i, j) relative to a known designated point. The designated point may correspond to a position of one of the microphones, or to electronic device 120. The source position 130 maybe a first distance D1 away from a first microphone 112, a second distance D2 away from second microphone 114, and a third distance D3 away from third microphone 116. The position of each microphone in the microphone set 110 relative to another microphone in the microphone set is known or determinable. The individual microphones each receive the sound emitted by the event at source 130.

The electronic device 120 records information from sound received by each microphone in the microphone set 110. The information recorded from the sound may be dependent on the distance between the source position 130 and the microphone receiving the sound. Since the relative positions of the microphones in the microphone set are known relative to one another, the information recorded from the sound received by each microphone provides information about the distance between the source position 130 and the designated point in the localization apparatus.

As will be described, information that can be recorded from microphones receiving the sound from source position 130 may include the amplitude of an incoming sound emitted by an event occurring at the source position, and/or the time in which each microphone is determined to receive the sound caused by the same event. This information may be used to determine range values and a direction of the source point 130 from the designated point, so that the source position 130 may be approximated relative to the designated point. According to one embodiment, at least three microphones are needed in microphone set 110 in order to determine two or three dimensions that locate the source position 130 from the designated point. The electronic device 120 may execute one or more algorithms, such as described in FIG. 2, FIG. 3 and FIG. 6, to approximate the position of the source position 130.

In one embodiment, the approximated source position is used as input for operating the electronic device. In one application, the electronic device corresponds to a projector connected to a portable computer (see e.g. FIG. 8). The projector is configured to display a set of inputs on a surface for a user. The user's selection of one of the inputs is determined by the location where the user contacts the surface. The user's contact may cause a "tap" or similar sound to be created. This sound is detected by microphones that surround the surface where the set of inputs is being displayed. The sound locates the position where the user made the tap. This position is interpreted as input for operating the electronic device. The input may correspond to a key selection, such as provided by a QWERTY keyboard.

In another embodiment, the electronic device corresponds to a camera, video recorder, or other image capturing device having processing abilities. The event may correspond to a voice created by a speaker in a room. A localization apparatus such as described with FIG. 1 may be used to determine the position of the speaker. This input may be used to adjust the image capturing device to reflect range and direction of the speaker relative to the image capturing device. This allows the image capturing device to track the speaker while keeping the speaker's image in focus. Several other applications may employ features described by embodiments of the invention. For example, a remote-control system for controlling an electronic device may be configured to interpret a user's gestures as commands. The remote-control system may be employed to control a wide variety of electronic devices, such as televisions, audio systems, and home entertainment centers. In one application, an optical detection system is used to interpret gestures, such as made with an arm, hand or finger, as a command. A sound-detection system can be used to initiate the optical detection system by directing the optical detection system to a user that has selected to make the commands. For example, a user can choose to enter a gesture command by first making a sound, such as a voice-command or a finger snap. The sound-detection system may approximate the position of the user in the room, so that the optical detection system can be trained onto that user to detect the user's gestures. The sound-detection system may identify a position of the user, including identifying a range of the user from the electronic device being controlled. Once the user's position is approximated, the optical-detection system can differentiate the user from other individuals who may be moving or making motions that could otherwise mistakenly be interpreted as commands.

In another application, a security system device may be automatically controlled through sounds made by movement or activity. For example, a video recorder may monitor a designated region for security purposes. According to an embodiment, the video recorder is configured to approximate the source position of an activity or event by detecting and analyzing emitted sounds from the activity or event. The video recorder may be integrated into a localization apparatus such as described by FIG. 1 so as to be automatically focused and trained onto the approximate source position of the emitted sounds. In this way, an event of interest to the security system may be tracked and recorded in focus by the video recorder.

Figure 2:
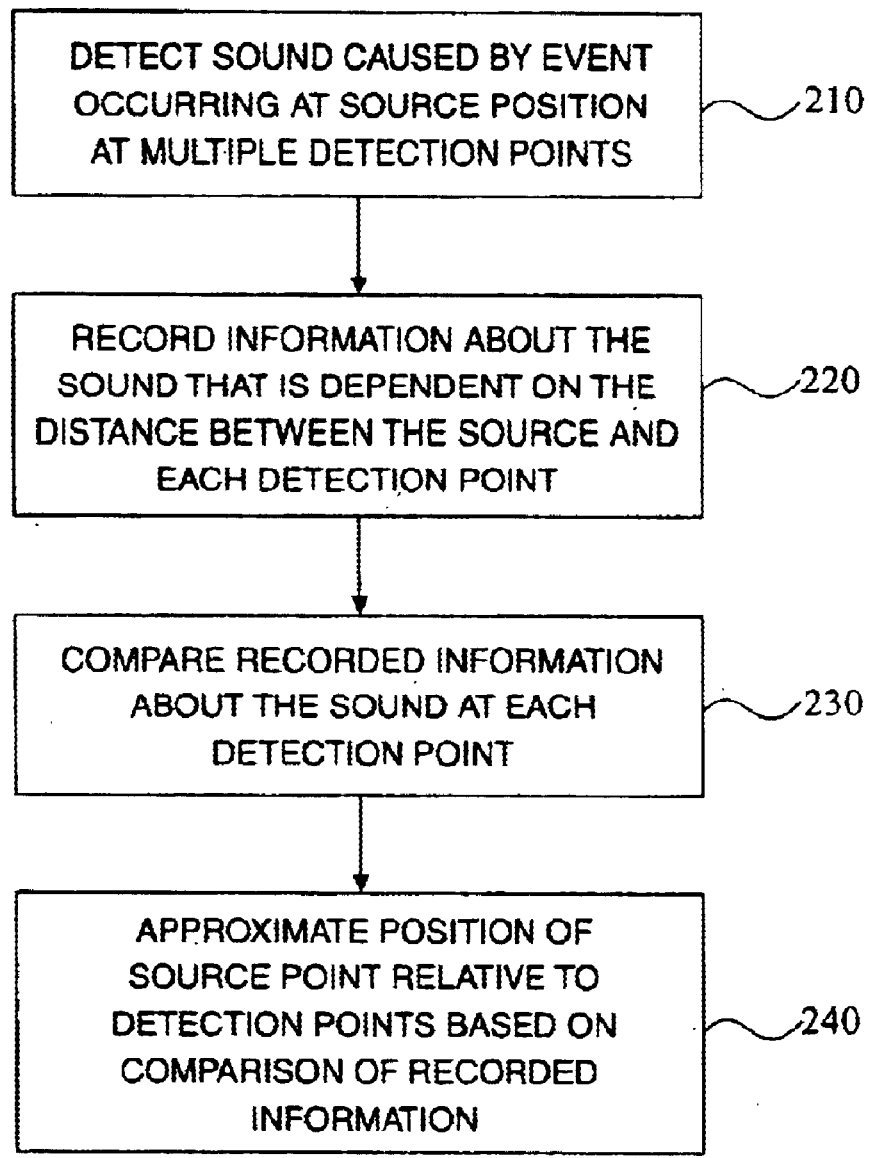
FIG. 2 illustrates a method for approximating a source position of where a sound-causing event of interest occurs.

FIG. 2 illustrates a method for approximating a source position of where a sound-causing event of interest occurs. A method such as described with FIG. 2 may be implemented using a localization apparatus such as described with FIG. 1. Any reference to numerals of FIG. 1 is intended to illustrate exemplary components for practicing an embodiment of the invention, as described by FIG. 2.

In step 210, a sound caused by an event of interest occurring at source position 130 is detected at a plurality of detection points. In one embodiment, each detection point may coincide with the placement of a microphone in microphone set 110. As will be described, one example of a sound-causing event of interest is a "tap" on a surface corresponding to a user's selection of an input (see FIG. 8). Another example is the detection of a spoken word by a speaker in a room.

In step 220, information about the sound caused by the event at source position 130 may be recorded when the sound is determined as being received by each detection point. The information may be recorded by electronic device 120. The information is dependent on the distance between the source position 130 and microphones in microphone set 110 that receives the sound. For example, if the microphones are arranged in a non-linear fashion with respect to source position 130, the information recorded at each microphone in the microphone set 110 may be distinguishable from information recorded by another microphone in the microphone set. The effect of distance on the information recorded as a result of each microphone in microphone set 110 receiving the sound is indicative of the position of source position 130.

According to one embodiment of the invention, information recorded by the electronic device 120 may correspond to an amplitude of the sound recorded at each of the microphones in the microphone set 110 emitted from the event of interest. According to another embodiment, the information recorded by the electronic device 120 may correspond to the time at which the electronic device records the arrival of the sound emitted by the event of interest at each microphone in microphone set 110. In still another embodiment, the information recorded is a combination or average of the amplitude of the sound received by each microphone, and the recorded time at which the electronic device 120 detects the sound as arriving at each microphone.

In step 230, information recorded at each microphone in microphone set 110 is compared with information recorded by at least one other microphone in the microphone set. The information compared may correspond to the amplitude of the sound received at each microphone in the microphone set 110, and/or the time at which the sound is determined as being received by each of the microphones.

In step 240, dimensions defining a space between the source position 130 and the designated point are approximated using the information recorded at each of the detection points. In one embodiment, approximation is made based on a comparison of the information recorded for each microphone. For example, a first dimension for defining source position 130 relative to the designated point may be determined by comparing the information recorded from first microphone 112 receiving the sound to the information recorded by the second microphone 114 receiving the same sound. A second dimension may be determined by comparing the information recorded from first microphone 112 receiving the sound to the information recorded by the third microphone 116 receiving the same sound. A third dimension may be determined by comparing the information recorded from second microphone 114 receiving the sound to the information recorded by the third microphone 116 receiving the sound. Additional microphones may be employed to make additional comparisons between microphones for purpose of redundancy and added dimensions.

As a result of a method such as described with FIG. 2, the range(s) and direction of the source position may be determined in relation to the detection points. In contrast, some prior art techniques that utilize microphone arrays that record sound information can only tell the direction in which the sound is being received. Such techniques cannot tell the range of the source position for where the sound is or was created.

Figure 3:
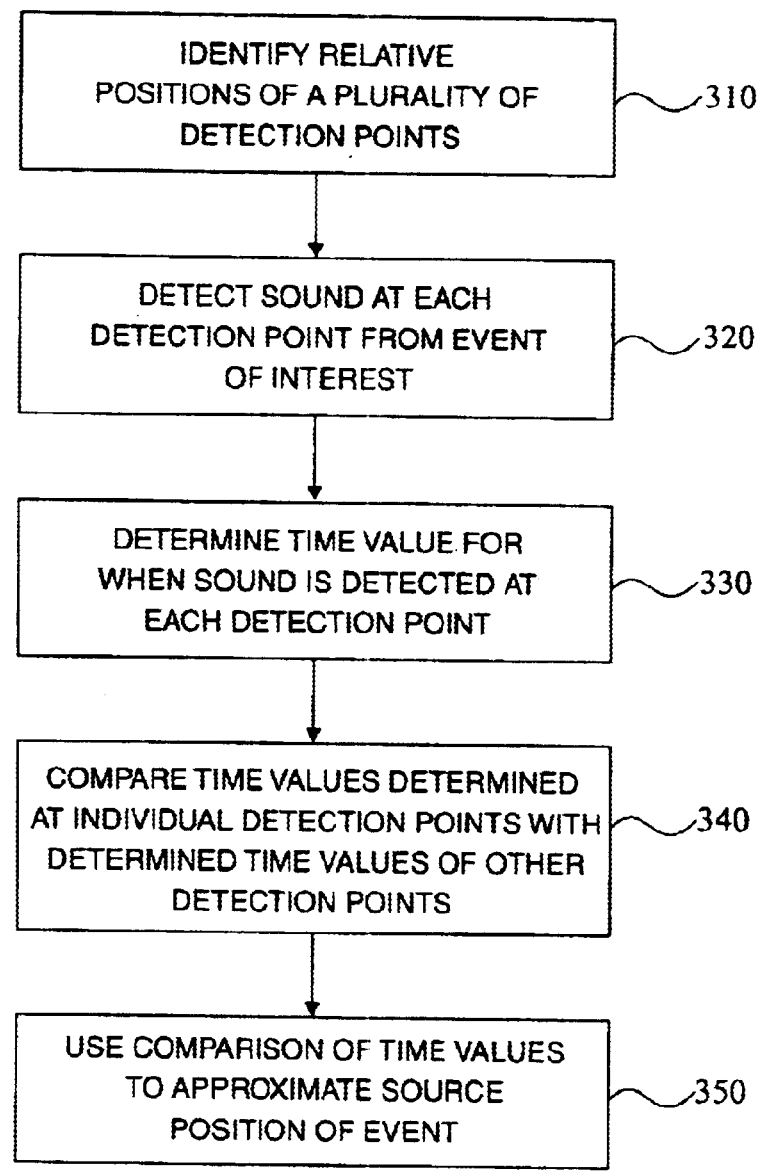
FIG. 3 illustrates a method for approximating a source position of where an event of interest occurs using a time value of when the sound emitted by the event is received at different detection points.

C. Approximating the Source Position Using Detected Time Values of the Sound Received from the Source Position FIG. 3 illustrates a method for approximating a source position of where an event of interest occurs using a time value of when the sound emitted by the event is received at different detection points. A method such as described with FIG. 3 may be implemented using components described with localization apparatus such as described by FIG. 1. Any reference to numerals of FIG. 1 is intended to illustrate exemplary components for practicing an embodiment such as described by FIG. 3.

In step 310, the positions of individual detection points are identified relative to other detection points in the plurality of detection points. For example, microphones in microphone set 110 may be employed in a fixed arrangement so that their relative positions with respect to one another are known. In one application, the microphones 112, 114 and 116 may be constructed in a housing that keeps the microphones in a fixed position relative to one another.

Alternatively, microphones 112, 114 and 116 are each independently positionable. In such embodiments, the microphones 112, 114 and 116 are calibrated once the microphones are positioned. A calibration process may be performed by first positioning the microphones in an operative relationship with an electronic device. Then a sound is emitted from a known reference point. Information from the sound is used to determine positions of the microphones relative to one another, based on the position of the reference point being known.

Figure 8:
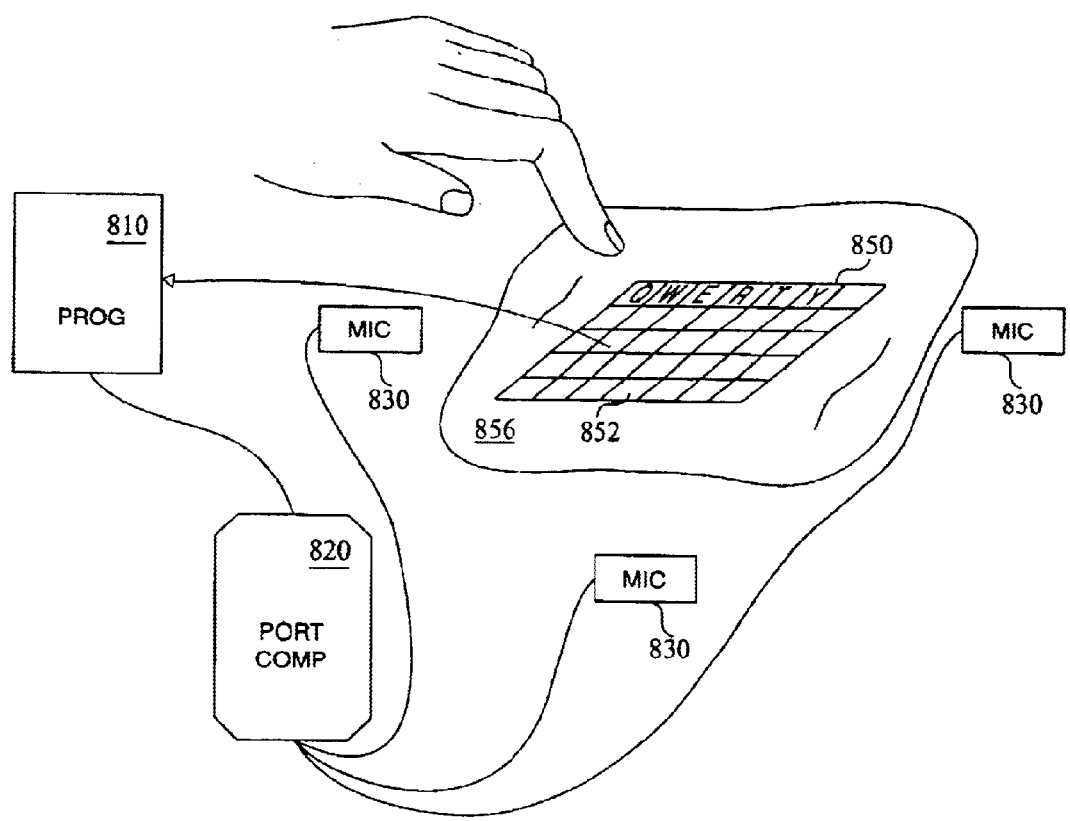
FIG. 8 illustrates a system using an imaged keyboard, under an embodiment of the invention.

For example, in one application described in FIG. 8, sound is used to detect a key selected by a user being displayed an image of a set of keys. The microphones may be positionable so as to detect taps corresponding to the user touching a space on which the image of the set of keys is being displayed. Once the microphones are positioned, the user may be required to touch a surface at a point corresponding to a designated calibration key. The position of each key in the set of keys may be known relative to the key designated for calibration. Since the spatial relationship between the set of keys being displayed is known, the selection of the calibration key enables the relative distances between the microphones to be determined.

In another calibration technique, the distance between each microphone in the microphone set 110 may be measured after the microphones in the array are placed in the desired position.

In step 320, sound emitting from the event at the source position 130 is detected at each of the plurality of detection points. The sound from the event may need to be distinguished from background sounds, or sounds from events that are not of interest. Thus, in FIG. 1, for example, electronic device 120 has to be configured to make a determination as to when sound from the event has arrived. The arrival of the sound from the source position 130 is detected and differentiated from other sounds, such as ambient noise and noise from events that are not of interest. Additional description of determining when sound from an event of interest arrives is described with FIG. 7.

Step 330 provides that the time value for when sound is detected as arriving at each detection point is determined. The time value may correspond to a time stamp of when each of the microphones in microphone set 110 is determined to receive the sound from source position 130. The time value marked at each detection point is dependent on the distance between that detection point and the source position 130.

Step 340 provides that the time values determined at individual detection points are compared with time values determined at other detection points. For example, a time stamp marked when first microphone 112 receives the sound from source position 130 is compared with one or both time stamps marked when each of second microphone 114 and third microphone 116 receive the same sound.

In step 350, the comparison of the time values are used to approximate the position of the source position. For example, a difference between the time stamp at first microphone 112 and second microphone 114 may be used to determine one dimension of the source position relative to the designated position. A difference between the time stamp at first microphone 112 and third microphone 116 may be used to determine a second dimension of the source position relative to the designated position. A similar difference may be calculated by comparing the second microphone 114 and third microphone 116 in order to determine a third dimension of the source position relative to the designated position.

Figure 4:
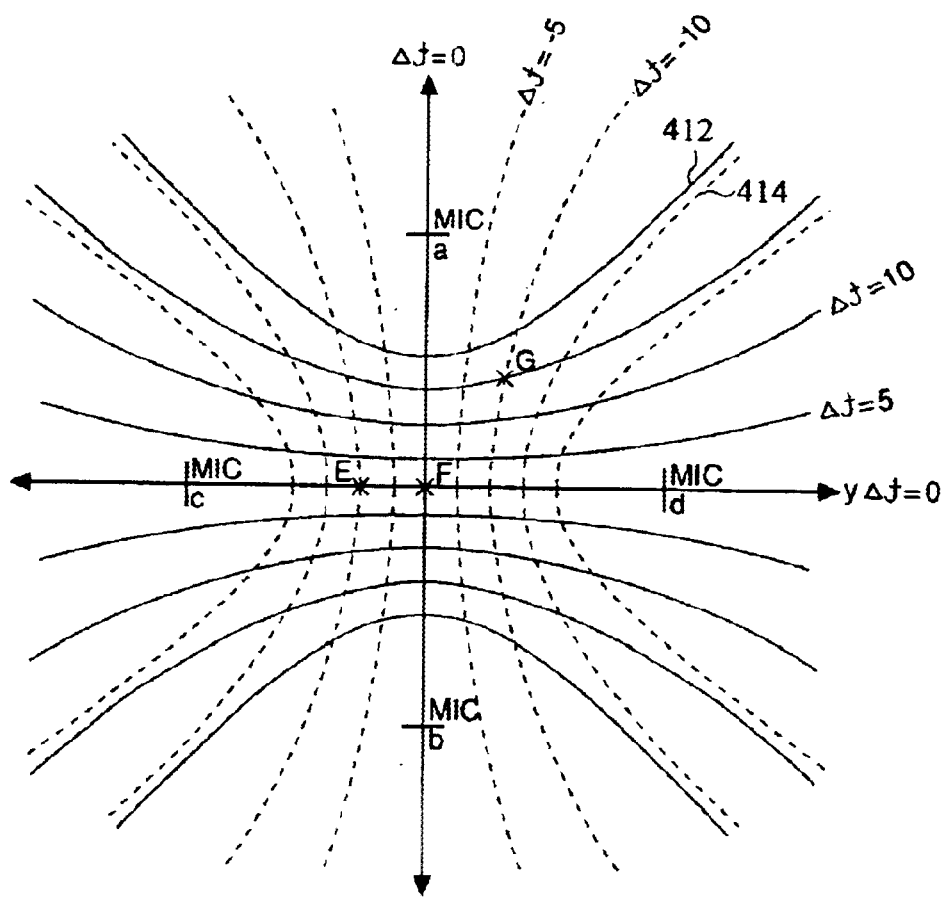
FIG. 4 illustrates a technique for determining the source position of a sound using the detected time values of when the sound is received by individual detection points.

FIG. 4 illustrates a technique for determining the source position of a sound using the detected time values of when the sound is received by individual detection points. Specifically, FIG. 4 illustrates use of an iso-delay map for approximating a source position of sound emitted by an event of interest. The iso-delay map consists of iso-delay curves that have been previously determined for sounds emitted at known source positions using known locations of detection points. Measured time values may be mapped onto the iso-delay map for purposes of finding intersecting iso-delay curves that approximate the source position of the event of interest.

Given two microphones (i.e. first microphone 112 and second microphone 114) located at detection points a and b, and a source position of a sound at p, the iso-delay curves can be used to determine the magnitude and direction of vector p. If a sound propagates from p at velocity v, it reaches the microphone at b with a time delay $d_{ab}$ after reaching the microphone at a. This delay satisfies the equation $$vd_{ab}=\|a-p\|-\|b-p\| \qquad (1)$$

where the vertical bars denote the Euclidean norm. In this equation, a, b and v are known, and $d_{ab}$ is a measured value between pairs of microphones.

How this equation is used depends on whether or not the point p is on a known plane that also contains points a and b. For example, in FIG. 8, all sounds from events of interest may be assumed to be on surface 836, which may be a table. Thus, in this example, the positions of two microphones may be assumed to be on a known plane—the surface 836. If all points are on a known plane, equation (1) is a quadratic equation in the two unknown variables in p. Equation (1) can be used to determine an iso-delay curve on the plane, on which the sound source must lie. This curve (i.e., 412) is the iso-delay curve for delay $d_{ab}$ between a pair of microphones a and b.

For example, suppose that microphones at a second pair of microphones c and d similarly measure a second delay $d_{cd}$. One of these two microphones (i.e. second microphone 114 and third microphone 116) could coincide with the microphone at a, or with the one at b. With equation (1), the new pair of microphones yields a new iso-delay curve (e.g. 414). The intersection of the two curves determines the location of the source position.

In FIG. 4, iso-delay curves for two pairs of microphones are shown for two pairs of microphones arranged on the vertices of a diamond. The solid curves 412 are for one pair of microphones, and the dotted curves 414 are for the other. The two pairs of microphones may be formed using three microphones, as shown with FIG. 1. To illustrate by way of example, a first pair of microphones (e,g, first microphone 112 and second microphone 114) are aligned along an axis Z, and a second pair of microphones (first microphone 112 and third microphone 116) are aligned along an axis Y. The time values measured between each microphone pair are mapped onto iso-delay curves 412, 414. The point at which the iso-delay curves intersect is the approximate source position.

The proximity of the source point to one microphone in a pair effects the position of the source point on the iso-delay map along the axis defining that pair of microphones. For example, E in FIG. 4 represents a source point that is centrally positioned between the first pair of microphones on axis Z, but more proximate to one of the second pair of microphones on axis Y over the other microphone in that pair. Point F represents a source position that is central to both microphone pairs. Point G represents a source position that is skewed towards one of the microphones in both pairs.

Each iso-delay curve in FIG. 4 represents one increment of time differential between the time one microphone in a pair of microphones receives a sound from the source point, as compared to the other microphone in the pair. For example, if the source position corresponds to Point A, the iso-delay curve indicates that one of the first microphone 112 receives the sound from the event two time increments (e.g. 10 microseconds) before the third microphone 116. If the source position corresponds to Point B, one of the microphones in each pair receives the sound from the source position before the other microphone in that pair. For the pair of microphones defined by axis Z, one microphone in that pair receives the sound from the source position three time increments before the other microphone in that pair. For axis Y, one microphone receives the sound from the source position two time increments before the other microphone in that pair. If the source position corresponds to Point C, then each microphone in both pairs receives the sound from the source position at approximately the same time.

For some arrangements of the microphones, it is possible that two curves for the two microphone pairs intersect at two different points. Which of these two points corresponds to the sound source can be determined by either adding a third pair of microphones, or by using external knowledge. For instance, if the system is used to determine the location of a finger tap on a desktop, the area in which taps are allowed may be known, and microphones can be arranged so that only one intersection for each pair of curves lies within this area.

For three-dimensional applications, additional information is needed from a third pair of microphones. Each of the three pairs of microphones is said to yield a quadratic iso-delay surface (not shown) in space, rather than a curve. The three microphone pairs are necessary to localize the sound source because at least three dimensions are needed to locate the source point. The three dimensions may correspond to three ranges relative to an origin or a designated position, or a combination of direction and ranges. The minimum number of microphones is three, since microphones a, b, c yield three pairs (a, b), (a, c), and (b, c).

Graphical representations consisting of iso-delay curves or surfaces may be used to determine source positions of sounds in a confined space. Such graphical representations may be stored in the electronic device and be applicable for the confined space, so that when separate microphones record information about the sound, data may be matched to processes that use iso-delay curves or quadratic iso-delay surfaces to determine the source position.

Figure 5:
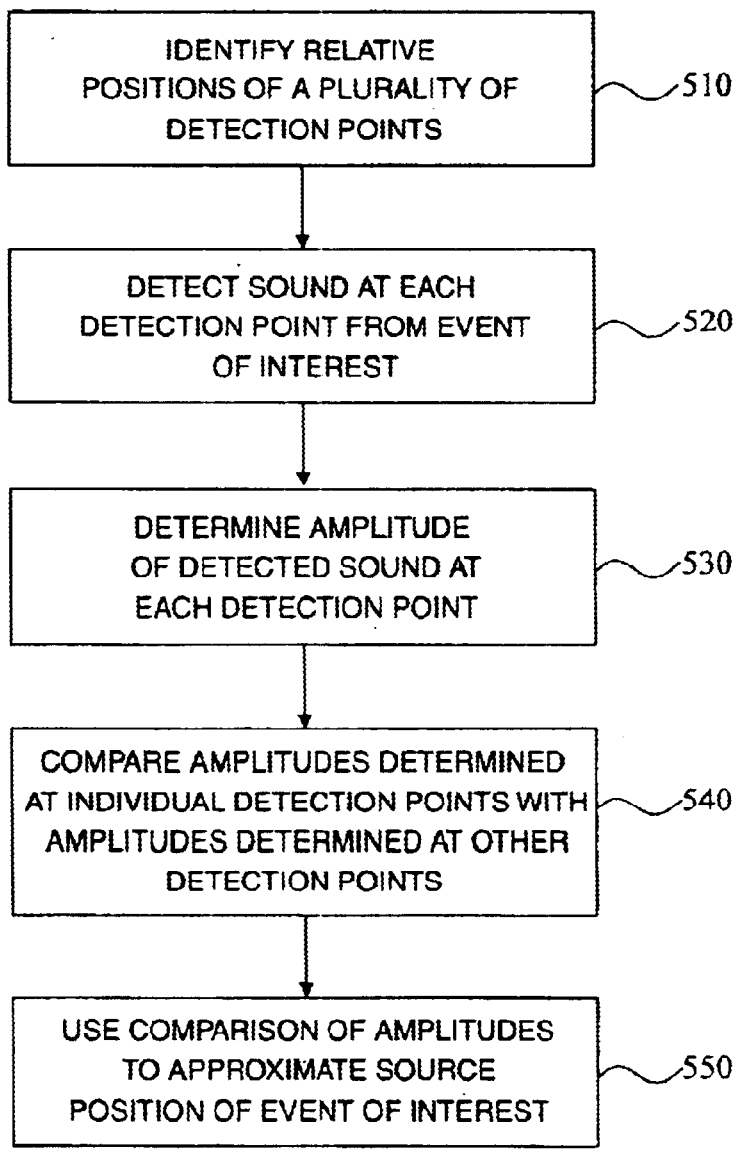
FIG. 5 illustrates a method for approximating a source position of where an event of interest occurs using amplitude information derived from the sound emitting from the event.

D. Approximating the Source Position Using the Determined Amplitude of the Sound Caused by the Event FIG. 5 illustrates a method for approximating a source position of where an event of interest occurs using amplitude information derived from the sound emitting from the event. A method such as described with FIG. 5 may be implemented using localization apparatus (FIG. 1). Any reference to numerals of FIG. 1 is intended to illustrate exemplary components for practicing an embodiment of the invention, as described by FIG. 5.

In step 510, the relative positions of a plurality of detection points are identified. This step may be performed in a manner described with FIG. 3.

Step 520 provides that the sound from an event occurring at the source point 130 is detected as being received. This step may be performed in a manner such as described with FIG. 3 and FIG. 7.

In step 530, the amplitude of the detected sound at individual detection points is determined. It is possible for this step to be performed as part of step 520. The amplitude of the detected sound is another example of information about sound that is dependent on the distance between the source of the sound and its detection point. The reason for this is described with FIG. 6.

In step 540, the amplitudes of the sound determined at the individual detection points are compared to one another. The amplitudes may be compared in a manner similar to the comparison of time values, as described in FIG. 3.

Step 550 provides that the comparisons made of the amplitudes at the individual detection points are used to approximate the source position of the sound. For example, a difference between the amplitude of the sound measured at a first detection point and at a second detection point may be used to calculate a first range value for locating the source position of the sound from a designated point. A difference between the amplitude of the sound measured between a second pair of detection points may be used to calculate a second range value for locating the source position of the sound from the designated point. A third range value may similarly be calculated for locating the source position relative to the designated point.

Figure 6:
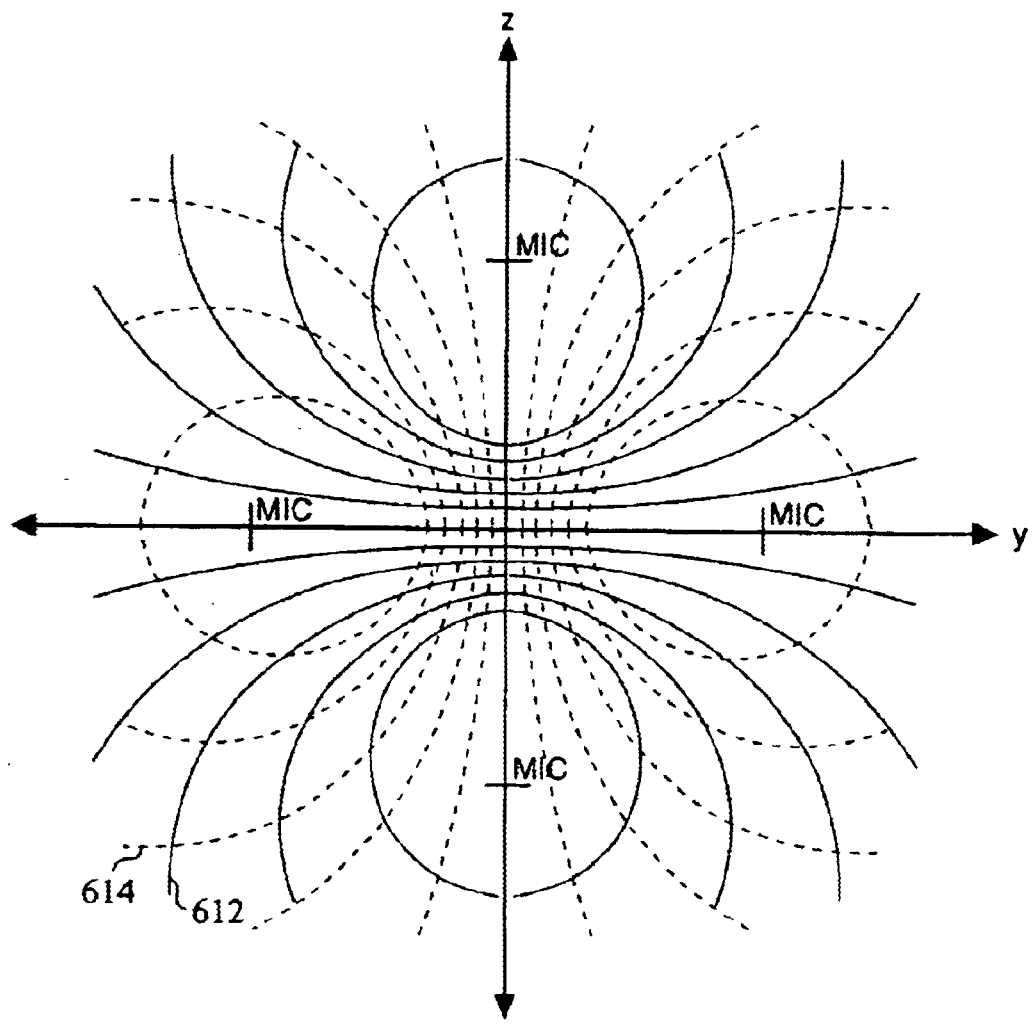
FIG. 6 illustrates a technique for determining the source position of the sound based on the determined amplitudes of the sound at the individual detection points.

FIG. 6 illustrates a technique for determining the source position of the sound based on the determined amplitudes of the sound at the individual detection points. In FIG. 6, a geometric locus map is used to approximate the source position of sound emitted by an event of interest. The map contains a series of curves, individually referred to as a locus, which are each determined from differences in the measured amplitudes of the sound detected by a designated pair of microphones. At least two loci exist for when sound is measured by a set of three microphones. The intersection of loci determined by pairs of microphones, in a set of three or more microphones, corresponds to the approximate source position. The geometric locus map may be used with a method such as described with FIG. 5. The locus for one pair of microphones along an axis Z are represented by solid lines 612, and for another pair of microphones along an axis Y are represented by dashed lines 614.

Given known spatial relationships between the microphones, a locus map such as shown by FIG. 6 may be predetermined. Then, differences in amplitudes measured by pairs of microphones may be mapped onto the locus map. The approximate source position may correspond to where two loci curves located by amplitude differences between two pairs of microphones intersect.

An individual locus may be determined as follows. Given a pair of omni-directional microphones located at points a and b, and a sound source at p with an arbitrary amplitude, the technique may be developed in the following manner. The microphones at a and b will receive sounds with amplitudes of $\alpha$ and $\beta$, respectively. If a sound propagates through a three-dimensional medium to reach a microphone, then the amplitude of the sound decays by a rate that is inversely proportional to the distance traveled. The law of power conservation explains this easily: Since sound waves propagate spherically in the air, the total power will traverse increasingly large spheres. At a distance r from the sound source, the sphere in question has a surface area $4\pi r^2$. Hence, power decays as inversely proportional to square of the traveled distance. Since the power is related to the square of the sound amplitude, the amplitude decays inversely proportional to the distance. Hence, the ratio $\alpha/\beta$ of the amplitudes will be the reciprocal of the ratio $\|a-p\|/\|b-p\|$ between the traveled distances. That is, $$\|a-p\|/\|b-p\|=\beta/\alpha. \qquad (2)$$

If the sound propagates in a two-dimensional medium, such as the surface of a table or other essentially two-dimensional object, then the sound amplitude decays inversely proportional to the square root of the traveled distance. A very similar explanation as in the air propagation case is derived from the power conservation law. In this case, total power will be distributed evenly on circles centered at the source point p. Since the circumference of a circle is equal to $2\pi r$, power (amplitude) decays inversely proportional to the (square root of) distance or, conversely, the ratio of distances is the reciprocal of the squared ratio of amplitudes. For example, two microphones can be attached on a flat surface and the sound emitted by any physical impact on this surface will propagate through this surface to reach the microphones. In this case the relationship will be $$\|a-p\|/\|b-p\|=(\beta/\alpha)^2. \tag{3}$$

In any case, regardless of whether a two-dimensional or a three-dimensional medium is considered, the following relationship exists between amplitudes and distances:

$$\frac{\|a-p\|}{\|b-p\|} = f\left(\frac{\beta}{\alpha}\right), \tag{4}$$

where the function $f(\cdot)$ is known. For the two-dimensional case, we have $f(x)=x^2$. For the three-dimensional case, we have $f(x)=x$.

The function $f(\cdot)$ is in both cases a power function. Taking logarithms in equation (3) then yields a linear equation:

$$\delta-\epsilon=k(B-A) \tag{5}$$

where $\delta=\ln\|a-p\|$, $\epsilon=\ln\|b-p\|$, $A=\ln\alpha$, and $B=\ln\beta$. The known constant k is equal to 1 in three dimensions, and to 2 in two dimensions. The form (5) of the equation is often preferable from a numerical analysis point of view. If $n \geq 3$ microphones measure amplitudes $a_1, \ldots, a_n$ at positions $a_1, \ldots, a_n$, then several equations of the form (3) or (4) are available.

Just as for the time-measurement case, each such equation determines one of the geometric locus in FIG. 6 on which the sound source must lie. For the two-dimensional case, each locus is a curve. In the three-dimensional case, each equation determines a surface (not shown). Two pairs of microphones (with the pairs optionally sharing one microphone) determine the location of the sound source in two dimensions. In the three-dimensional case, at least three pairs (any two of which can share at most one microphone) are needed. In either case, additional microphones can be used to provide redundant measurements, and therefore yield better accuracy in the result.

For simplicity, explanation of this technique will be limited to the two-dimensional case, shown in FIG. 6. Amplitudes determined from a first pair and a second pair of microphones are mapped onto the set of locus shown in FIG. 6. Each amplitude locates a locus, and where the two identified loci meet coincides with the approximate source position of the sound. The set of loci may be determined beforehand if the locations of the microphones in the pairs are known relative to one another.

E. Detecting the Arrival of Sound from an Event of Interest

Figure 7:
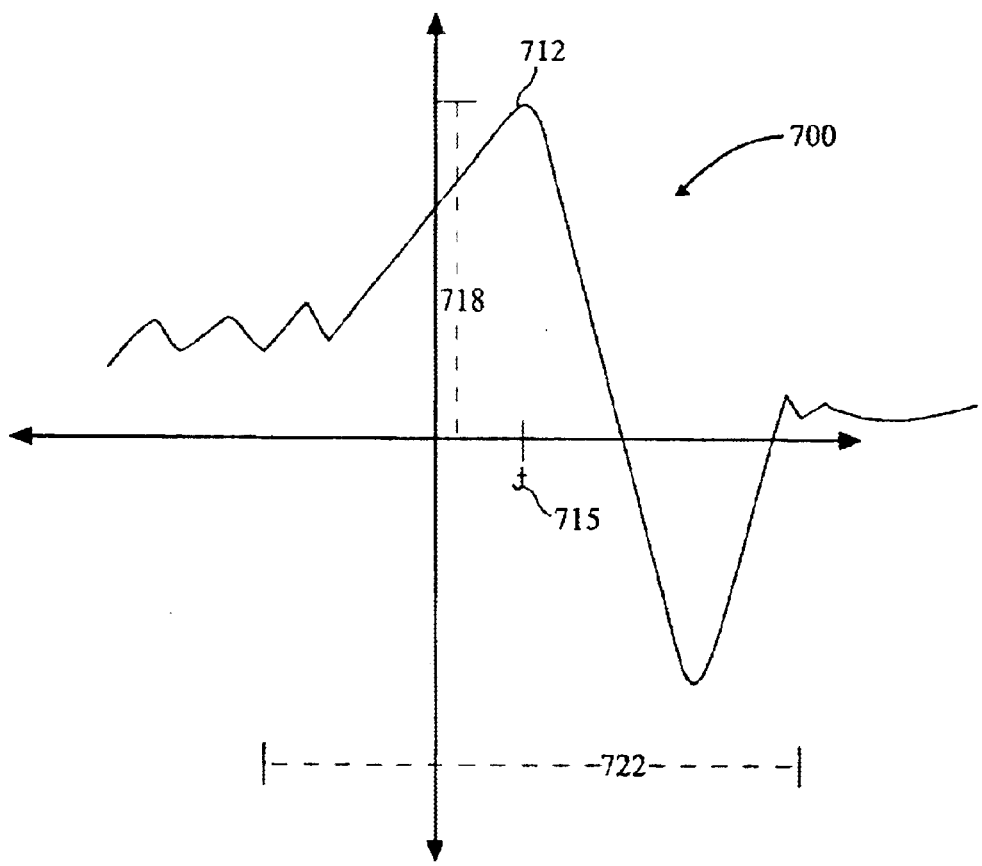
FIG. 7 illustrates characteristics of a waveform that can be used to determine when a sound caused by an event of interest is determined as being received by microphones in a microphone set.

FIG. 7 illustrates characteristics of a waveform that can be used to determine when a sound caused by an event of interest is determined as being received by microphones in an microphone set (i.e., 110 in FIG. 1). Without identifiable characteristics in the waveform that can be detected, microphones in microphone set 110 may not be able to distinguish sounds caused by events of interest from sounds caused by other events, or by noise.

A microphone in an arrangement such as shown by FIG. 1 may detect thousands of sound measurements per second. Furthermore, the sound emitting from an event of interest may last for more than a second, so thousands of acoustic measurements may be made for the duration that sound from an event of interest is received by one microphone.

Furthermore, some events of interest may cause secondary sounds which provide false information. For example, a tap sound on a table may generate echoes when the sound bounces back from the ends of the table, so that the sound detected by the microphones includes both the tap and its echoes. Embodiments of the invention differentiate sounds caused by events of interest from other sounds, including secondary sounds that may be caused by the same event, but carry false information.

In order to accurately determine which sounds provide location information from events of interests, waveforms of the sounds received by microphones at each detection point may be detected and analyzed for characteristics that indicate the nature of the sound. In one embodiment, the characteristic of a waveform 700 that is detected and analyzed is a peak 712. This waveform characteristic is well-suited for when the sound emitted by the event is sharp.

For example, the peak 712 may be detected if the value of the peak is greater than or within a range of peak values that correspond to a known sound emitting from the event of interest. In a more specific example, finger taps on a table may coincide with events of interest. In FIG. 1, the electronic device 120 analyzing the sounds received by the microphones in microphone set 110 may seek certain limit or range of peak values known to coincide with finger taps on a given surface. When during a designated interval, the peak 712 is detected, the electronic device 120 knows the sound received by the microphone is from an event of interest.

According to one embodiment, a time value is associated with the peak 712. For example, a time stamp 715 of when the peak 712 occurs may be used to subsequently approximate the source position of the event, as described in FIG. 3. According to another embodiment, a magnitude 718 of the peak 712 may be used to subsequently determine the approximate source position of the event, as described in FIG. 5.

In another embodiment, the waveform characteristic used to detect when microphones receive the sound from the event of interest is a waveform shape. This technique may be referred to as matched filtering. In one application, the shape of the waveform in the interval defined by 722 may match a shape of known waveform corresponding to the event of interest. Once the waveform 700 is detected as being received, a beginning point or amplitude of the waveform may be used to record the time stamp for when the waveform is received by one of the microphones. The magnitude 718 of the peak detected for the duration 722 may be used to subsequently determine the approximate source position of the event, as described in FIG. 5. In another embodiment, the time stamp assigned to the waveform as detected by its shape may be used to approximate the source position, as described with FIG. 3.

F. Combining Results from Two Techniques to Approximate Source Position

According to another embodiment, the source position of a sound caused by an event of interest may be determined using a combination of techniques described herein. The localization methods described in FIG. 3 and FIG. 5 used detected time values and amplitudes separately. However, since each of the localization methods are based on independent sources of information, each localization method has essentially independent noise statistics. In other words, the source position approximated by each localization method is affected in different ways by an inhomogeneous medium, or by electronic noise in the microphone amplifiers, and other deviations from an ideal situation. It therefore may be advantageous to use both methods, and combine their results, especially when a higher accuracy is required in the localization results than what could be obtained with either method used alone.

One way to combine results is to average them. If the localization method based on detecting time-stamps yields a position estimate $p_t$ for the location of the source position, and the amplitude-based method yields an estimate $p_a$, then the combination could be computed using this relationship:

$$p = k_t p_t + k_a p_a \quad (6)$$

In this equation, the quantities $k_t$ and $k_a$ are based on estimates of the relative accuracy of the two methods, and could be functions of position:

$$k_t = k_t(p_t) \text{ and } k_a = k_a(p_a) \quad (7)$$

For instance, these two numbers or functions could be proportional to the reciprocals of the standard deviations of localization errors, as determined by a calibration procedure.

G. User-Interface Device for Using Sound to Detect User-Input

Embodiments of the invention may be used to enable a user to select an input for operating an electronic device. The user may specify the input by selecting a position for where a sound-emitting event is to occur. In one application, the user may make a key entry by tapping a region defined for a key. The region may be defined using, for example, a displayed image of a keyboard.

FIG. 8 illustrates a system using an imaged keyboard, under an embodiment of the invention. The system includes a projector 810, a electronic device 820 and an set of microphones 830. The projector 810 is equipped to display an image 850 of a set of keys onto a surface 836. The microphone set 830 at least partially surrounds the area of the surface 836 where the image 850 is being displayed. In one application, image 850 may correspond to a QWERTY keyboard.

A user can select one of the regions 852 differentiated in the image 850 as input for electronic device 820. The user may make the selection by touching surface 836 in one of the regions 852 corresponding to the key that the user wishes to select. The act of touching the surface 836 causes a sound to be emitted (i.e. a tap) from the region of the surface 836 where that key is displayed. The microphones 830 detect that sound.

The electronic device 820 is configured to realize when that sound is detected. For example, the electronic device 820 may be configured to detect one of the characteristics of the sound received from the user's action, as described with FIG. 4. Upon the sound from the user selection being detected, electronic device 820 processes that sound as it was received by each of the microphones 830 for information that is dependent on the space between the contacted region and the microphone detecting the sound.

In one embodiment such as described with FIG. 3, electronic device 820 will detect a time stamp for when the sound of the tap was received by each microphone 830. The time stamp values may be used in a manner such as described by FIG. 3 to detect the contacted region 852 corresponding to the selected key.

In another embodiment, electronic device 820 will detect an amplitude of the sound received by each microphone 830. Similarly, the amplitudes may be used in a manner such as described by FIG. 5 to detect the contacted key 852 of image 850 being selected by the user. Still further, a combination of methods such as described with FIG. 3 and FIG. 5 may be used to detect which key the user selected. For example, the source position of the user's selection may be approximated using two or more methods, and then averaged.

H. Hardware Diagram

Figure 9:
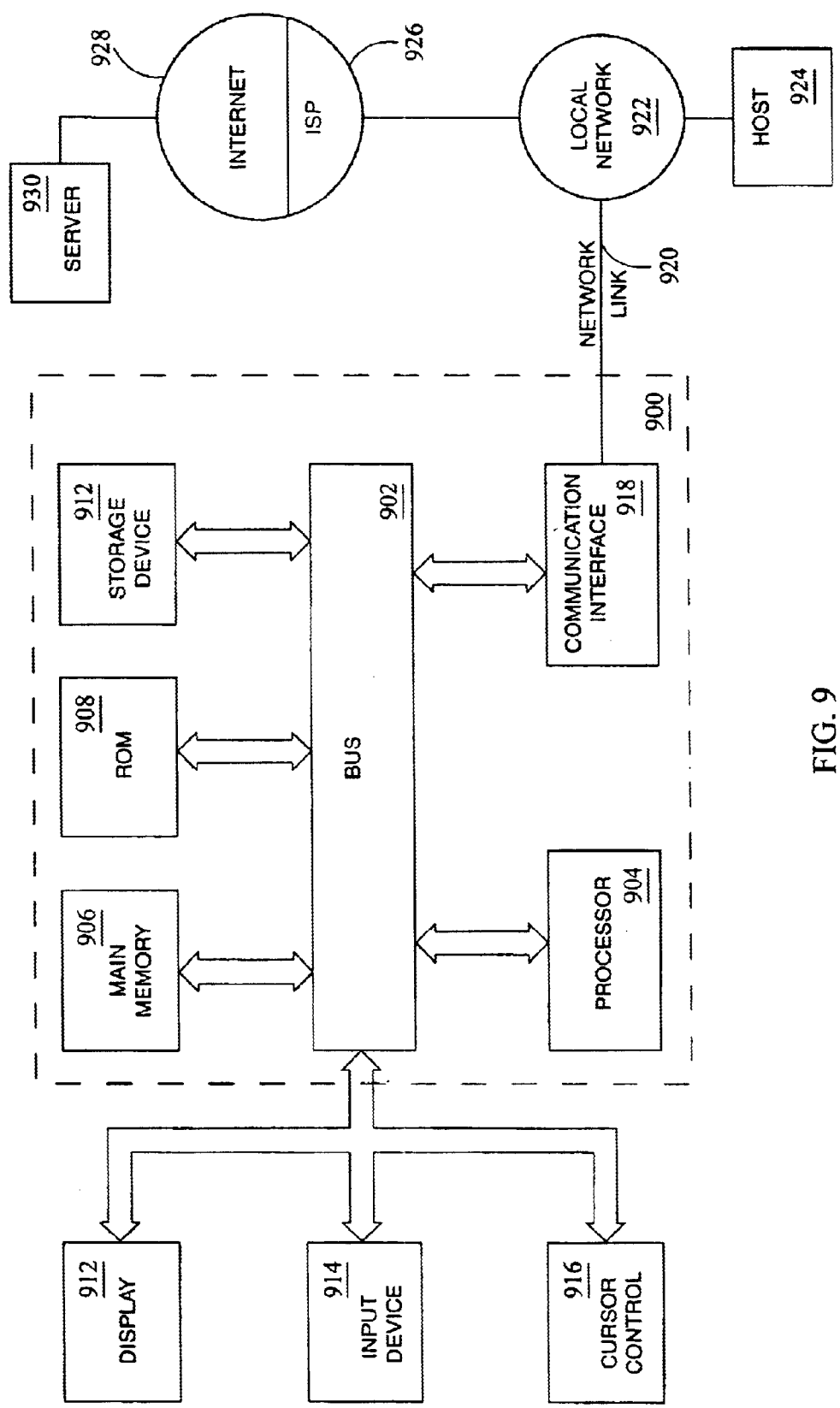
FIG. 9 is a block diagram that illustrates a computer system upon which an embodiment of the invention may be implemented.

FIG. 9 is a block diagram that illustrates a computer system 900 upon which an embodiment of the invention may be implemented. The computer system 900 may be any electronic device having a processor that is configured or programmed to implement steps for performing embodiments of the invention, as described herein. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for approximating a source position of a sound-causing event for determining an input used in operating a computer system. According to one embodiment of the invention, a method for approximating a source position of a sound-causing event for determining an input used in operating a computer system is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for approximating a source position of a sound-causing event for determining an input used in operating a computer system as described herein.

The received code may be executed by processor 904 as it is received, and/or stored in storage device 910, or other non-volatile storage for later execution. In this manner, computer system 900 may obtain application code in the form of a carrier wave.

I. Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for approximating a source position of a sound-causing event for determining an input used in operating an electronic device, the method comprising:

monitoring an area using a plurality of detection points for an occurrence of the event at any location within the area;

detecting a sound caused by the event occurring at a location corresponding to the source position using the plurality of detection points, the source position being within the area that is being monitored;

independently of knowing a time in which the sound of the event is emitted, recording information about the sound at individual detection points in the plurality of detections points, the information being dependent on a distance between the source position and each of the individual detection points;

determining, approximately, the source position based on the recorded information and on a relative position of individual detection points in the plurality of detection points to other detection points in the plurality of detection points;

determining the input from the source position; and causing an operation to be performed by the electronic device based on the input.

2. The method of claim 1 wherein detecting a sound includes detecting the sound emitted by a user contacting the area that is being monitored at the location corresponding to the source position, wherein the source position is part of a first designated region wherein the area is divided into a plurality of designated regions that include the first designated region, each of the plurality of designated regions being associated with a corresponding input, and wherein determining the input includes determining the corresponding input for the first designated region.

3. The method of claim 1, wherein detecting a sound includes detecting the sound emitted by a user contacting the monitored region at the location corresponding to the source position, wherein the source position is part of a first designated region and wherein the area is divided into a plurality of regions, each of the plurality of designated regions being associated by the electronic device as a corresponding key in a set of keys, and wherein determining the input includes determining the corresponding key for the first designated region.

4. The method of claim 1, wherein detecting a mound includes detecting the sound emitted by a voice of a person at the location corresponding to the source position, and wherein determining the input includes determining at least a first range value for focusing an image capturing device on the source position.

5. The method of claim 4, wherein determining at least a first range value includes determining range values in at least two dimensions.

6. The method of claim 1, wherein recording information about the sound at individual detection points includes:

identifying an amplitude of the sound at each of the plurality of detection points; and wherein determining the source position includes:
comparing the amplitude identified at each of the plurality of detection points to the amplitude of the sound identified at one or more other detection point.

7. The method of claim 1, wherein recording information about the sound at individual detection points includes:
determining a time value corresponding to a determination of an arrival of the sound at each of the plurality of detection points; and wherein determining the source position includes:
comparing the time value determined at each of the plurality of detection points to the time value determined at one or more other detection points in the plurality of detection points.

8. The method of claim 6, wherein comparing the amplitude identified at each of the plurality of detection points includes:
determining a first comparison value representing a difference between the amplitude at each of a first pair of detection points in the plurality of detection points; and
using the first value to determine a first range value of the source position from a designated position along an axis defining a first dimension between the source position and the designated position.

9. The method of claim 8, wherein comparing the amplitude identified at each of the plurality of detection points includes:
determining a second comparison value representing a difference between the amplitude at each of a second pair of detection points in the plurality of detection points; and
using the second comparison value to determine a second range value of the source position from the designated position along an axis defining a second dimension between the source position and the designated position.

10. The method of claim 9, wherein comparing the amplitude identified at each of the plurality of detection points includes:
determining a third comparison value representing a difference between the amplitude of each of a third pair of detection points in the plurality of detection points; and
using the third comparison value to approximate a third range value of the source position from the designated position along an axis defining a third dimension between the source position and the designated position.

11. The method of claim 10, wherein comparing the amplitude identified at each of the plurality of detection points includes determining the amplitude of the sound detected at each detection point in a set of three detection points.

12. The method of claim 1, wherein recording information about the sound at individual detection points in the plurality of detections points includes determining a first time value corresponding to a determination of an arrival of the sound at a first detection point in the plurality of detection point, determining a second time value corresponding to a determination of an arrival of the sound at a second detection point in the plurality of detection points, and determining a third time value corresponding to a determination of an arrival of the sound at a third detection point in the plurality of detection points.

13. The method of claim 12, wherein determining the source position includes determining a first comparison value corresponding to a difference of the first time value and the second time value, and a second comparison value corresponding to a difference of the first time value and the third time value.

14. The method of claim 13, wherein determining the source position includes using the first comparison value to determine a first range value of the source position from a designated position along an axis defining a first dimension between the source position and the designated position, and using the second comparison value to determine a second range value of the source position from the designated position along an axis defining a second dimension between the source position and the designated position.

15. The method of claim 14, wherein determining the source position includes determining a third comparison value corresponding to a difference of the first time value and the third time value, and using the third comparison value to determine a third range value of the source position from the designated position along an axis defining a third dimension between the source position and the designated position.

16. The method of claim 1, wherein detecting a sound caused by the event includes marking an approximate pea amplitude of the sound at each detection point in the plurality of detection points as the arrival of the sound at that detection point.

17. The method of claim 1, wherein detecting a sound caused by the event includes detecting an approximate waveform shape of the sound at each detection point in the plurality of detection points, and comparing the approximate waveform shape to a known waveform shape to determine that the sound from the event arrived at that detection point.

18. The method of claim 1, wherein recording information about the sound at individual detection points in the plurality of detections points includes:
identifying an amplitude of the sound at each of the plurality of detection points;
determining a time value corresponding to detection of the sound at each of the plurality of detection points; and wherein determining the source position includes:
comparing the amplitude identified at each of the plurality of detection points to the amplitude of the sound identified at one or more other detection point to determine at least a first amplitude-determined range value and a second amplitude-determined range value; and
comparing the time value determined at each of the plurality of detection points to the time value determined at one or more other detection points in the plurality of detection points to determine at least a first time-determined range value and a second time-determined range value.

19. The method of claim 18, wherein determines the source position includes determining a first range value by determining an average of the first amplitude-determined range value and the first time-determined range value, the first range being along an axis defining a first dimension between the source position and the designated position.

20. The method of claim 19, wherein determining the source position includes weighting the average of the first amplitude-determined range value and the first time-determined range value.

21. The meted of claim 19, wherein determining the source position includes determining a second range value by determining an average of the amplitude-determined second range value with the time-determined second range value, the second range value being along an axis defining a second dimension between the source position and the designated position.

22. The method of claim 21, wherein determining the source position includes weighting the average of the amplitude-determined range value and the time-determined range value.

23. The method of claim 21, wherein determining the source position includes;
   comparing the amplitude identified at each of the plurality of detection points to the amplitude of the sound identified at one or more other detection point to determine a third amplitude-determined range value; and
   comparing the time value determined at each of the plurality of detection points to the time value determined at one or more other detection points in the plurality of detection points to determine a third time-determined range value; and
   determining an average of the third amplitude-determined range value and the third time-determined range value.

24. The method of claim 23, further comprising weighting the average of the third amplitude-determined range value and the third time-determined range value.

25. An apparatus for approximating a source position of a sound-causing event for determining an input used in operating an electronic device, the system comprising:
   a plurality of sound-detection devices arranged to receive a sound caused by the event when the event is caused by an object that is external to the apparatus; and
   a processor operatively coupled to the plurality of sound-detection devices, the processor being configured to:
      detect that the sound-detection devices receive the sound;
      independent of knowing a time in which the sound of the event is emitted, record information about the sound detected at individual sound-detection devices, the information being dependent on a distance between the source position and the individual sound-detection devices;
      approximate the source position based on the recorded information and on a relative position of individual sound-detection devices in the plurality of sound-detection devices to other sound-detection devices in the plurality of sound-detection devices;
      determine the input from the source position; and
      execute an operation based on the input.

26. The apparatus of claim 25, wherein the processor is configured to detect the sound emitted by a user contacting a region selected from a plurality of regions, each of the plurality of regions being associated with a corresponding input, and to determine the corresponding input for the contacted region.

27. The apparatus of claim 26, wherein the processor is configured to detect the sound emitted by a user contacting a region selected from a plurality of regions, each of the plurality of regions being associated assigned a corresponding key in a set of keys by the processor, and wherein the processor is further configured to determine the corresponding key for the contacted region.

28. The apparatus of claim 27, wherein the processor is configured to detect the sound emitted by a voice at the source position, and to determine at least a first range value fur focusing an image capturing device on the source position.

29. The apparatus of claim 25, wherein the processor is configured to detect that the sound-detection devices receive the sound caused by the event by detecting an amplitude of a waveform corresponding to the sound.

30. The apparatus of claim 25, wherein the processor is configured to detect that the sound-detection devices receive the sound caused by the event by matching a waveform corresponding to the sound to a waveform of the sound-causing event.

31. The apparatus of claim 25, wherein the sound-detection devices are arranged non-linearly relative to a reference plane.

32. The apparatus of claim 31, wherein the processor is configured to approximate the source position based on a relative position of individual sound-detection devices by:
   determining a time value corresponding to each of the sound-detection devices being determined to receive the sound from the source position;
   comparing the time value determined by each of the plurality of sound-detection devices to the time values determined by one or more other sound-detection devices in the plurality of sound-detection devices.

33. The apparatus of claim 25, wherein the processor is configured to approximate the source position based on a relative position of individual sound-detection devices by:
   identifying an amplitude of the sound at each of the plurality of sound-detecting devices;
   comparing the amplitude identified at each of the plurality of sound-detecting devices to the amplitude of the sound identified at one or more other sound-detecting device.

34. A method for detecting a user-input, the method comprising:
   monitoring an area on a surface for an occurrence of a sound caused by a user directing an object to make contact with the surface at any location within the area;
   displaying an image of a set of keys on the area of the surface;
   detecting a sound caused by the user directing the object to make contact with the surface at a location within the area;
   independently of knowing a time in which the source is emitted, determining a source position of the sound; and
   identifying which key in the set of keys correlates to the source position of the sound.

35. The method of claim 34, wherein identifying which key in the set of keys correlates to the source position includes identifying which key is displayed at or nearest to the source position.

36. The method of claim 34, wherein displaying an image of a set of keys includes displaying a QWERTY keyboard.

37. An apparatus for detecting a user-input, the apparatus comprising:
   a projector to display an image corresponding to a set of keys on a surface;
   a plurality of sound-detection devices arranged to monitor an area and detect a sound corresponding to a user directing an object to make contact with the surface at any location within the area; and
   a processor configured to:
      record information about the sound at individual detection points in the plurality of detection points, wherein the information is dependent on a distance between a source position of the source and each of the individual detection points;
      independent of knowing a time an which the source of the event is emitted, approximate the source position of the sound using the recorded information and the relative position of the individual detection points in the plurality of detection points; and determine which key in the set of keys corresponds to the approximated source position.

38. The apparatus of claim 37, wherein the processor is configured to determine which key in the set of keys corresponds to the approximated source position by identifying which key has an image that occupies the source position of the sound on the surface.

39. A computer-readable medium for approximating a source position of a sound-causing event for determining an input used to operate an electronic device, the computer-readable carrying instructions fix performing the steps of:

monitoring aware using a plurality of detection points for an occurrence of the event at any location within the area;

detecting a sound caused by to event occurring at a location corresponding to the source position using the plurality of detection points, the source position being within the area that is being monitored;

independently of knowing a time in which the source of the event is emitted, recording information about the sound at individual detection points in the plurality of detections points, the information being dependent on a distance between the source position and each of the individual detection points;

determining, approximately, the source position based on the recorded information and on a relative position of individual detection points in the plurality of detection points to other detection points in the plurality of detection points;

determining the input from the source position; and causing an operation to be performed by the electronic device based on the input.

40. The computer-readable medium of claim 39, wherein instructions for detecting a sound include instructions for detecting the sound emitted by a user contacting the area that is being monitored at the location corresponding to the source position, wherein the source position is part of a first designated region and wherein the area is divided into a plurality of designated regions that include the first designated region, each of the plurality of designated regions being associated with a corresponding input, and wherein instructions for determining the input include determining the corresponding input for the first designated region.

41. The computer-readable medium of claim 39, wherein instructions for detecting a sound include instructions for detecting the sound emitted by a user contacting the monitored region at the location corresponding to the source position, wherein the source position is part of a first designated region and wherein the area is divided into a plurality of regions, each of the plurality of designated regions being associated by the electronic device as a corresponding key in a set of keys, and wherein instructions for determining the input include instructions for determining the corresponding key for the first designated region.

42. The computer-readable medium of claim 39, wherein instructions for detecting a sound include instructions for detecting the sound emitted by a voice of a person at the location corresponding to the source position, and wherein instructions for determining the input include instructions for determining at least a first range value for focusing an image capturing device on the source position.

43. The computer-readable medium of claim 42, wherein instructions for determining at least a first range value include instructions for determining range values in at least two dimensions.

44. The computer-readable medium of claim 39, wherein instructions for recording information about the sound at individual detection points include instructions for:

identifying an amplitude of the sound at each of the plurality of detection points; and wherein instructions for determining the source position include instructions for:

comparing the amplitude identified at each of the plurality of detection points to the amplitude of the sound identified at one or more other detection point.

45. The computer-readable medium of claim 39, wherein instructions for recording information about the sound at individual detection points include instructions for:

determining a time value corresponding to a determination of an arrival of the sound at each of the plurality of detection points; and wherein instructions for determining the approximate source position include instructions for:

comparing the time value determined at each of the plurality of detection points to the time value determined at one or more other detection points in the plurality of detection points.

46. The computer-readable medium of claim 44, wherein instructions for comparing the amplitude identified at each of the plurality of detection points include instructions for:

determining a first comparison value representing a difference between the amplitude at each of a first pair of detection points in the plurality of detection points; and using the first value to determine a first range value of the source position from a designated position along an axis defining a first dimension between the source position and the designated position.

47. The computer-readable medium of claim 46, wherein instructions for comparing the amplitude identified at each of the plurality of detection points include instructions for:

determining a second comparison value representing a difference between the amplitude at each of a second pair of detection points in the plurality of detection points; and using the second comparison value to determine a second range value of the source position from the designated position along an axis defining a second dimension between the source position and the designated position.

48. The computer-readable medium of claim 47, wherein instructions for comparing the amplitude identified at each of the plurality of detection points include instructions for:

determining a third comparison value representing a difference between the amplitude of each of a third pair of detection points in the plurality of detection points; and using the third comparison value to approximate a third range value of the source position from the designated position along an axis defining a third dimension between the source position and the designated position.

49. The computer-readable medium of claim 39, wherein instructions for recording information about the sound at individual detection points in the plurality of detections points include instructions for:

identifying an amplitude of the sound at each of the plurality of detection points;

determining a time value corresponding to detection of the sound at each of the plurality of detection points; and wherein instructions for determining the source position include instructions for:
- comparing the amplitude identified at each of the plurality of detection points to the amplitude of the sound identified at one or more other detection point to determine at least a first amplitude-determined range value and a second amplitude-determined range value; and
- comparing the time value determined at each of the plurality of detection points to the time value determined at one or more other detection points in the plurality of detection points to determine at least a first time-determined range value and a second time-determined range value.

50. The computer-readable medium of claim 49, wherein instructions for determining the source position include instructions for determining a first range value by determining an average of the first amplitude-determined range value and the first time-determined range value, the first range being along an axis defining a first dimension between the source position and the designated position.

51. The computer-readable medium of claim 50, wherein instructions for determining the source position include instructions for weighting the average of the first amplitude-determined range value and the first time-determined range value.

52. The computer-readable medium of claim 51, wherein instructions for determining the source position include instructions for determining a second range value by determining an average of the amplitude-determined second range value with the time-determined second range value, the second range value being along an axis defining a second dimension between the source position and the designated position.

53. The apparatus of claim 25, wherein the event corresponds to the object making contact with a surface, and wherein the apparatus does not include either the object or the surface.

* * * * *